United States Patent [19]

Fowler

[11] Patent Number: 4,525,369

[45] Date of Patent: Jun. 25, 1985

[54] APPARATUS AND METHOD FOR SUPPORTING, GUIDING AND TEMPERATURE-TREATING A PUFF EXTRUDED FOOD PRODUCT

[75] Inventor: David P. Fowler, Irving, Tex.

[73] Assignee: Frito-Lay, Inc., Dallas, Tex.

[21] Appl. No.: 623,410

[22] Filed: Jun. 22, 1984

[51] Int. Cl.³ .............................................. A23L 1/28
[52] U.S. Cl. ..................................... 426/446; 99/485; 425/377; 426/281; 426/447; 426/448; 426/449
[58] Field of Search ................. 99/485; 426/496, 497, 426/499, 448, 281, 94, 283, 284, 446, 449, 450; 406/136, 138, 94, 89; 425/377

[56] References Cited

U.S. PATENT DOCUMENTS

| | | | |
|---|---|---|---|
| 2,527,466 | 10/1950 | Townsend | 406/89 |
| 2,882,097 | 4/1959 | Hamren | 406/89 |
| 3,444,826 | 5/1969 | Seeder | 425/377 |
| 3,615,675 | 10/1971 | Wisdom et al. | 426/281 |

Primary Examiner—Robert W. Jenkins
Attorney, Agent, or Firm—Bernard, Rothwell & Brown

[57] ABSTRACT

An apparatus and method for supporting, guiding and temperature-treating a continuously moving rope of puff extruded farinaceous food material of generally C-shaped cross-section. The moving rope is supported and cooled from below by a stream of air exiting from openings in the upper edge of a former bar, which is positioned below the rope and extends into the concave portion of the cross-section. Air is directed downwardly onto the top and sides of the moving rope from a plenum chamber and nozzle assembly positioned above the moving rope.

8 Claims, 3 Drawing Figures

APPARATUS AND METHOD FOR SUPPORTING, GUIDING AND TEMPERATURE-TREATING A PUFF EXTRUDED FOOD PRODUCT

BACKGROUND OF THE INVENTION

1. Field of the Invention

This invention relates to the production of composite snack items having an expanded, cellular edible outer shell portion of farinaceous material and an edible center portion of a filling material. More particularly, this invention relates to an apparatus and method for supporting, guiding and temperature-treating a puff extruded farinaceous food product of generally C-shaped cross-section.

2. Prior Art

It is known in the prior art to produce composite snack food items by puff extruding a hollow or concave cross-section of a light, cellular, farinaceous material and subsequently injecting a filling material into the hollow or concave portion thereof. As used herein, the term "puff extruded" refers to material produced by extruding a cross-sectional mass of farinaceous material under conditions which cause the extrudate to expand as it emerges from the extruder die to form a light, cellular material. The puff extruded material can be produced in any suitable hollow or concave cross-section such as an annular or generally C-shaped cross-section which provides a cavity for the subsequent introduction of the filling material. The term "generally C-shaped" is intended to include geometric variations such as U-shaped cross-sections. One advantage of such a configuration is that it can be filled on a continuous basis while moving.

A suitable apparatus for puff extruding a farinaceous material is described in U.S. Pat. No. 3,615,675. The apparatus comprises a screw extruder or other means capable of developing in a mass of food material a superatmospheric pressure and a temperature which is above the atmospheric boiling temperature of liquids within the edible material. The material passes through a die orifice and expands as it emerges from the die due to the vaporization of the liquids to form a light and cellular product. The puff extruded material emerges from the extruder to form a continuously moving rope having the desired cross-section. A takeoff device is generally positioned downstream from the extruder to maintain tension on the moving rope.

In the process described above, it is necessary to provide adequate support, guidance and cooling of the moving rope in order to maintain its dimensional stability. In the case of a generally C-shaped extrudate (also referred to as a "collett rope" or "C-shell"), the die can be arranged such that the concave portion of the cross-section faces downward. A former bar extending in the direction of travel of the rope is positioned adjacent the die and below the continuously moving rope such that the upper edge of the former bar extends into the concave portion of the C-shell to provide guidance and support. Unfortunately, if the former bar is stationary with respect to the moving rope, the hot farinaceous material will tend to stick to the bar upon contact, thus impeding movement of the rope. This problem can be overcome by providing a former bar which moves with the collett rope. This type of an arrangement, referred to as a "moving key", is undesirable in terms of its mechanical complexity.

SUMMARY OF THE INVENTION

This invention provides an apparatus and method for supporting, guiding and temperature-treating (e.g., cooling) a continuously moving rope of puff extruded farinaceous food material of generally C-shaped cross-section exiting from an extruder die.

The apparatus of the invention employs a stationary former bar which is positioned adjacent the die orifice and extends longitudinally in the direction of movement of the rope. The former bar has at least one opening disposed along its upper edge through which air can be passed, i.e., a plurality of holes or a slotted opening. Means are provided to supply air to exit through the openings in the upper edge of the former bar. The former bar is positioned such that the upper edge of the former bar extends into the concave portion of the C-shell cross-section. As the rope moves along the former bar, air is directed upwardly through the holes or slot along the upper edge of the former bar to support the rope on a thin layer of air. The stream of air also provides a means of temperature treating, e.g., cooling, the extruded farinaceous material as it passes over the former bar, as well as flushing any steam which may collect in the concave portion of the C-shell.

To counteract the tendency of the air exiting from the former bar to push the rope away from the former bar—possibly causing the C-shell to jump off the bar—an assembly is positioned above the rope and the former bar to restrain upward movement of the rope. This assembly comprises a plenum chamber having air inlet means and air outlet means. There are also provided means for directing the outlet air from the plenum chamber downwardly so that air impinges on the top and both sides of the outer, convex surface of the moving rope. This downward flow of air opposes and balances the upward flow of air exiting from the upper edge of the former bar to prevent the C-shell from jumping off the former bar. This stream of air also provides a means for temperature-treating e.g., cooling, the outer, convex surface of the C-shell.

As a preferred means of directing outlet air from the plenum chamber downwardly onto the moving rope, there is provided a nozzle assembly which comprises two opposing walls extending longitudinally in the direction of movement of the rope, the upper edges of said walls being contiguous with the bottom edges of the plenum chamber and a septum positioned between the two walls. The septum defines a plurality of air channels disposed on either side of the septum. The channels extend downwardly from and are in communication with the interior of the plenum chamber and terminate in a series of exit ports along the bottom surface of the nozzle assembly which are positioned above and along either side of the moving rope. Air under pressure is provided to the plenum chamber and exits the plenum chamber through the channels in the nozzle to impinge on the top and side surfaces of the rope.

DESCRIPTION OF THE PREFERRED EMBODIMENTS

The food material which may be used in the preparation of the C-shell may be any farinaceous product such as meal or flour derived from corn, wheat, rice, oats, barley, potatoes, tapioca, etc, which is capable of being puff extruded. As is known in the art, the preferred farinaceous material is cornmeal.

In order for the farinaceous material to expand or puff upon extrusion, it generally contains from about 10 to 25 percent by weight of water. This amount of moisture also renders the farinaceous material less viscous and, therefore, more easily extruded. However, an excess amount of moisture will limit expansion and delay maturing or curing of the expanded material.

Various conventional additives may also be present in the farinaceous material in order to assist in the processing or to affect the flavor or appearance of the material. These additives which are present in effective amounts known in the art are described, for example, in U.S. Pat. No. 3,615,675.

Referring to the Figures, the basic apparatus which is used to support, guide and temperature-treat the moving rope of puff extruded farinaceous food material includes a former bar 10, a plenum chamber 12 and a nozzle assembly 14 which directs outlet air from the plenum chamber 12 downwardly onto the top and sides of the moving rope 16.

Figure 3:
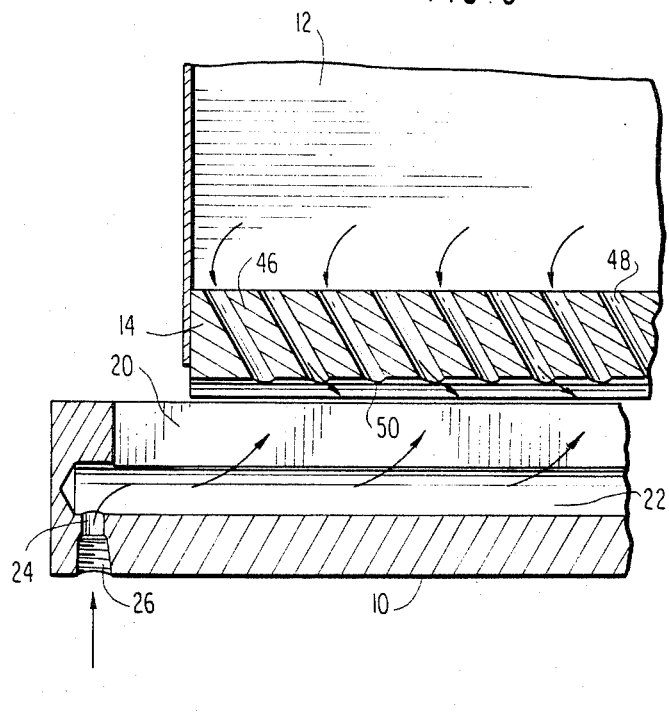
FIG. 3 is a cross-sectional view of a portion of the apparatus of the invention taken along line 3—3 of FIG. 2.

The former bar 10 is positioned adjacent the extruder die 18 (shown schematically) and below the moving rope 16, extending longitudinally in the direction of movement of the rope 16. The former bar 10 is positioned such that its upper edge extends into the concave portion of the moving rope 16. The upper edge of the former bar 10 is preferably cross-sectionally shaped to conform to the concave surface of the C-shell. The cross-sectional shape of the lower portion of the former bar 10, i.e., the portion which is outside the C-shell, is not particularly critical, but is preferably such that impingement of the outlet air from the nozzle assembly 14 onto its outer surface does not create excessive air turbulence. The former bar 10 has at least one opening 20 disposed along its upper edge which is capable of being connected to a source of compressed air (not shown). Either a series of openings can be provided along the length of the former bar 10 or preferably, a single, slotted opening (as shown in FIG. 3) can be provided which runs essentially the entire length of the former bar 10. The opening(s) 20 in the upper edge of the former bar 10 communicate with a cylindrical chamber 22 which extends longitudinally within the body of the former bar 10. The cylindrical chamber 22 is connected to a source of compressed air (not shown) through a passage 24 by means of a threaded fitting 26 which is compatible with a mated fitting on the end of an air hose 28. Air which exits from the opening(s) 20 in the upper edge of the former bar 10 supports the moving rope 16 on a thin layer of air and provides a means of temperature-treating the inner, concave surface of the C-shell and flushing any steam which may collect within the concave portion of the C-shell. It is preferred that the openings 20 in the upper edge of the former bar 10 be relatively small, so that the air is forced to exit at a sufficiently high velocity to provide support for the moving rope 16. In order to assist in the cooling function, it is preferred that the former bar 10 be constructed of a heat conductive material such as brass.

The plenum chamber 12 and nozzle assembly 14 are positioned above the former bar 10 and the moving rope 16. In the preferred embodiment which is illustrated, the plenum chamber 12 comprises two distinct sections. A tubular body 30 defining a primary plenum chamber 32 extends longitudinally in the direction of the moving rope 16. The primary plenum chamber 32 is connected to a source of pressurized air such as a blower 34 (shown schematically in FIG. 2) through a tee fitting 36 in the tubular body 30. The tubular body 30 contains a plurality of openings 38 in its lower surface, i.e., the lower 180° of its circumference, through which air can exit from the primary plenum chamber 32. Two sidewalls 40 extend longitudinally in the direction of movement of the moving rope, the upper edges of the sidewalls 40 being contiguous with the sides of the tubular body 30. The lower edges of the sidewalls 40 are closer together than the upper edges, such that the sidewalls 40, taken together with the lower surface of the tubular body 30 define a downwardly tapering secondary plenum chamber 42. The pressurized air passes into the primary plenum chamber 32 through the tee fitting 12 and is distributed throughout the primary plenum chamber 32. The air then passes into the secondary plenum chamber 42 through the openings 38 in the lower surface of the tubular body 30 and ultimately exits the secondary plenum chamber 42 through the space between the lower edges of the sidewalls 40. The downwardly tapered configuration of the secondary plenum chamber 42 minimizes the pressure drop between the air entering the primary plenum chamber 32 and the air exiting the secondary plenum chamber 42. The plenum chamber 12 can be constructed of any suitable material such as stainless steel.

The air exiting the secondary plenum chamber 42 passes through the nozzle assembly 14. The nozzle assembly 14 has two opposing sidewalls 44 which extend longitudinally in the direction of movement of the moving rope 16. The upper edges of the two sidewalls 44 of the nozzle assembly abut the bottom edges of the two sidewalls 40 which define the secondary plenum chamber 42. The nozzle assembly 14 contains a septum 46 positioned between the two sidewalls 44. The septum 46 defines a series of air channels 48 on either side of the septum 46 extending downwardly from and being in communication with the interior of the secondary plenum chamber 42. The air channels 48 lead to a series of exit ports 50 along the bottom surface of the nozzle assembly 14, such that the exit ports 50 are positioned above and along either side of the moving rope 16.

Figure 1:
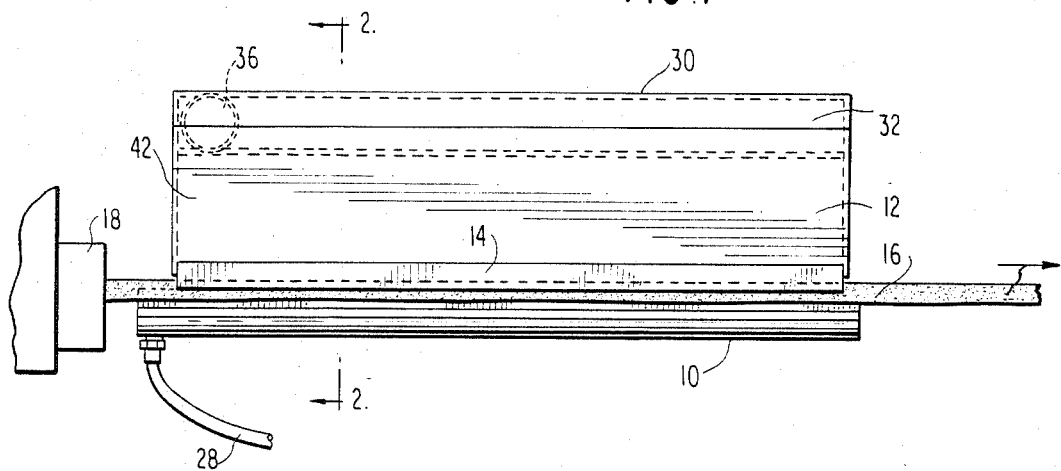
FIG. 1 is a side view of an apparatus of the invention, showing the former bar, plenum chamber and nozzle assembly.
Figure 2:
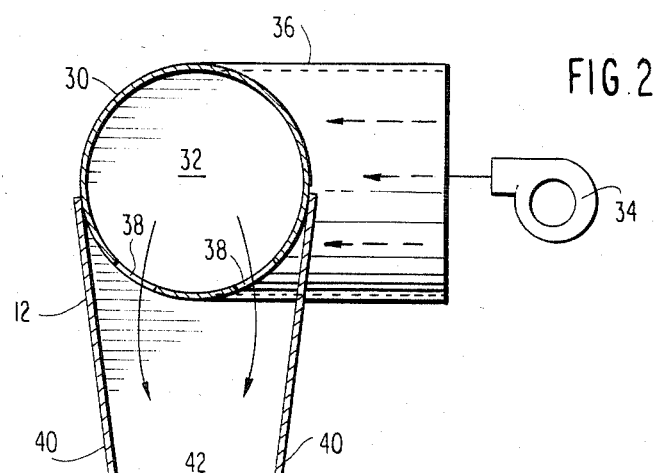
FIG. 2 is an enlarged cross-sectional view of an apparatus of the invention, taken through line 2—2 of FIG. 1, showing the former bar, plenum chamber and nozzle assembly.

FIGS. 2 and 3 illustrate the configuration of the septum 46. The air channels 48 defined by the septum 46 preferably extend downwardly and forward, as shown in FIG. 3 so that the air which is discharged from the nozzle assembly 14 moves downward and forward in the direction of movement of the rope 16 (shown by an arrow in FIG. 1) in order to assist the movement thereof. The cross-sectional configuration of the air channels 48 can be rectangular or they can have curved walls to reduce air drag through the air channels 48. It is preferred that the diameter or width of the air channels 48 be relatively small, in order that sufficient air velocity can be generated. The septum 46 is preferably constructed of a smooth material having a low coefficient of friction, such as molded poly(tetrafluoroethylene) or ultra-high molecular weight polyethylene.

The bottom surface of the nozzle assembly 14 is curved to conform to the upper, convex surface of the moving rope 16. The plenum chamber 12 and nozzle assembly 14 are positioned sufficiently close to the moving rope 16 that any upward movement of the rope away from the former bar 10 will be physically restrained by the nozzle assembly 14.

In the practice of the method of this invention, air is provided to the former bar 10 under sufficient pressure to support the moving rope 16 of puff extruded farinaceous material on a thin layer of air. The precise amount of air pressure will depend, inter alia, on the size and configuration of the openings 20 along the upper edge of the former bar 10. Air is provided to the plenum chamber 12 under sufficient pressure that the air exiting from the nozzle assembly 14 is capable of providing a downward force on the moving rope 16 which counterbalances the upward force of the air exiting from the upper edge of the former bar 10. The precise amount of air pressure will depend, inter alia, on the size and configuration of the plenum chamber 12 and the air channels 48. Preferably, relatively low pressures are employed in both the former bar 10 and plenum chamber 12. The air provided to the former bar 10 and the plenum chamber 12 can be heated or cooled, if desired, to temperature-treat the moving rope 16. By using the air to assist the cooling of the hot farinaceous food material, the length of travel required prior to the next downstream processing step can be reduced.

The air exiting from the nozzle assembly 14 is preferably directed downwardly and forward in the direction of movement of the rope 16 such that air impinges on the top and both sides of the C-shell. The direction of air movement is shown by means of arrows in FIGS. 2 and 3. The impingement of downwardly moving air on both sides of the convex outer surface of the C-shell provides lateral stability to the moving rope 16. The forward component of air movement assists the forward movement of the rope.

The apparatus and method of the invention provide the necessary support and guidance to the moving rope 16 of puff extruded farinaceous material without the danger that the farinaceous material may stick to the former bar 10 and without the necessity of using a mechanically complex arrangement such as a moving key conveyor, with its attendant maintenance requirements. Moreover, the apparatus and method of the invention provide an efficient means of cooling the moving rope 16 as it emerges from the extruder die 18. Consequently, space savings may be realized by reduction of the distance between the extruder and downstream processing equipment.

Since many modifications, variations and changes in detail may be made to the described embodiment, it is intended that all matter in the foregoing description and shown in the accompanying drawings be interpreted as illustrative and not in a limiting sense.

What is claimed is:

1. Apparatus for supporting, guiding and temperature-treating a continuously moving rope of puff extruded farinaceous food material of generally C-shaped cross-section exiting from an extruder die orifice, the apparatus comprising:
   (a) a former bar positioned adjacent the die orifice and extending longitudinally in the direction of movement of the rope such that the upper edge of the former bar extends into the concave portion of the cross-section, said former bar having at least one opening disposed along its upper edge;
   (b) means to supply air to exit from the openings in the upper edge of the former bar to support the moving rope on a layer of air; and
   (c) an assembly, positioned over the moving rope and the former bar, to restrain upward movement of the rope away from the former bar, said assembly comprising:
      (i) a plenum chamber having air inlet means and air outlet means; and
      (ii) means for directing outlet air from the plenum chamber downwardly along the top and side surfaces of the rope.

2. An apparatus as claimed in claim 1, wherein said means for directing outlet air from the plenum chamber is a nozzle assembly comprising:
   (a) two opposing walls extending longitudinally in the direction of movement of the rope, the upper edges of said walls being contiguous with the bottom edges of the plenum chamber; and
   (b) a septum positioned between said walls, said septum defining a plurality of air channels disposed on either side of the septum, said channels extending downwardly from and being in communication with the interior of the plenum chamber and terminating in a series of air exit ports above and along either side of the rope.

3. An apparatus as claimed in claim 2, wherein said channels extend from the plenum chamber downwardly and forward in the direction of movement of the rope.

4. An apparatus as claimed in claim 2, wherein the lower surface of the nozzle assembly is curved to conform to the outer, convex surface of the moving rope.

5. An apparatus as claimed in claim 1, 2, 3 or 4, wherein said plenum chamber comprises:
   (a) a tubular body defining a primary plenum chamber and extending longitudinally in the direction of movement of the rope, said body having an air inlet port and a plurality of air exit openings along its bottom surface; and
   (b) two sidewalls extending longitudinally in the direction of movement of the rope, the upper edges of said walls being contiguous with either side of the tubular body and the bottom edges of the walls being closer together than the top edges, such that the two sidewalls and the bottom surface of the tubular body define a downwardly tapering secondary plenum chamber in communication with the primary plenum chamber and having an air outlet opening between the lower edges of the two sidewalls.

6. A method for supporting, guiding and temperature-treating a continuously moving rope of puff extruded farinaceous food material of generally C-shaped cross-section exiting the extruder from a die orifice, the method comprising:
   (a) supporting and temperature-treating the moving rope by directing air upwardly to impinge on the inner concave surface of the C-shaped cross-section;
   (b) restraining upward and lateral movement of the rope and temperature-treating the rope by directing air downwardly to impinge on the top and sides of the outer, convex surface of the C-shaped cross-section; and (c) guiding the moving rope along the upper edge of a former bar which extends into the inner concave portion of the C-shaped cross-section.

7. A method as claimed in claim 6, wherein the air which impinges on the outer, convex surface of the C-shaped cross-section is directed downwardly and forward in the direction of movement of the rope.

8. A method as claimed in claim 6, wherein the air which supports the moving rope and the air which restrains upward and lateral movement of the rope is also employed to cool the moving rope.

* * * * *